July 7, 1936.   T. R. ALLEY ET AL   2,046,993
HULLER
Filed July 8, 1933
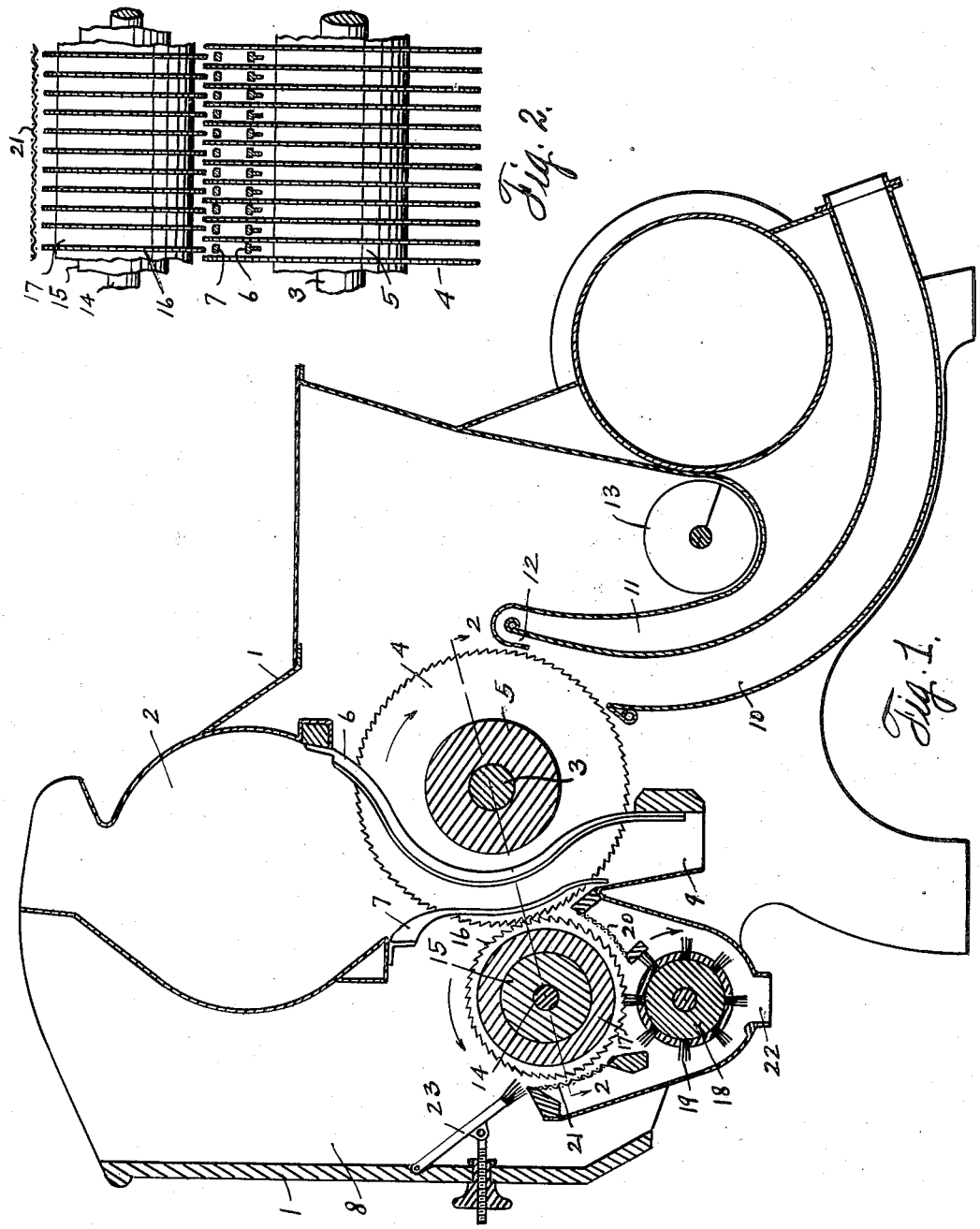
Inventors
Thomas R. Alley
Joseph D. Alley
By Hardway Cather
Attorneys Patented July 7, 1936

2,046,993

UNITED STATES PATENT OFFICE 2,046,993

HULLER

Thomas R. Alley and Joseph D. Alley, Alleyton, Tex., assignors of one-half to W. D. Estlinbaum, Colorado County, Tex.

Application July 8, 1933, Serial No. 679,517

6 Claims. (Cl. 19—56)

This invention relates to a huller, and has particular relation to novel means for removing hulls and other foreign matter from seed cotton preparatory to the ginning process.

An object of the invention is to provide in a cotton gin a gang of huller saws arranged in the seed cotton hopper of the gin and located to cooperate with the gin saws with a cleaner brush arranged to cooperate with the huller saws to remove the hulls and other foreign particles from the seed cotton preparatory to the entry of the seed cotton into the roll box of the gin.

A further object of the invention is to provide in combination with the huller saws, suitable screens whereby the dirt, sand and the like may be removed from the seed cotton.

With the above and other objects in view, the invention has particular relation to certain novel features of construction, operation and arrangement of parts, an example of which is given in this specification and illustrated in the accompanying drawing, wherein:

Figure 1 shows a longitudinal vertical sectional view of the gin, showing the huller, and Figure 2 shows a fragmentary sectional view taken on the line 2—2 of Figure 1.

Referring now more particularly to the drawing, wherein like numerals of reference designate similar parts in each of the figures, the numeral 1 designates the casing of the gin, which is of the usual construction.

This casing has the conventional roll box 2 in the upper portion thereof to receive the roll of seed cotton from the huller. Beneath the roll box is the transverse shaft 3 on which the gang of gin saws 4 is mounted, said saws being spaced the required distance apart by the spacers 5. Between the saws 4 are the conventional stripper ribs 6 and between the roll box and the huller are the huller ribs 7 between which the gin saws 4 work. The seed cotton is delivered into the hopper 8 of the huller and is carried therefrom by the gin saws 4 into the roll box 2, said ribs 7 being spaced a sufficient distance apart to permit the seed to pass with the cotton into the roll box. The cotton in the roll box is engaged by the teeth of the saws 4 and carried through between the stripper ribs 6, but these ribs arrest the seed and the lint is stripped therefrom and the seed fall down and pass from the gin through the chute 9 into a suitable conveyor, not shown. There is a lint duct which leads from the rear of the gin saws to a suitable lint flue, not shown, but by which the lint is conveyed to the condenser. There is an air duct 11 terminating in the nozzle 12 in tangential relation to the gin saws and through which an air blast is created to blow the lint from the saw teeth into the duct 10 and thence to the condenser. The motes and other foreign particles passing through the stripper ribs are thrown through centrifugal force into the conventional conveyor 13 by means of which they are carried away.

The parts hereinbefore described are of conventional construction common to cotton gins. The huller construction of novel formation will now be described:

At the bottom of the huller hopper 8 there is a transverse shaft 14. Fixed on this shaft there is a drum 15 on which there is a gang of circular huller saws 16 which are spaced apart by the spacers 17. These huller saws are smaller in diameter than the gin saws and are arranged in staggered relation to said gin saws. The gin saws and huller saws rotate in opposite directions as indicated by the arrows shown in Figure 1. Underneath the huller saws there is a transverse cleaner brush 18 extending across the gin casing, and having the rows of outwardly extending flexible brushes 19 which cooperate with the huller saws but which rotate in the opposite direction as shown by the arrow in Figure 1.

On opposite sides of the cleaner brush and extending transversely across the gin casing, are the foraminated rear and front screens 20, 21 which are spaced from and partly surround the huller saws.

The seed cotton in the hopper 8 will fall down upon the huller saws and be carried around forwardly and swept between said saws and the screen 21 and carried into cooperation with the cleaner brush whereby the hulls and foreign objects will be dislodged from the lint and will fall out through the downwardly directed chute 22. The seed cotton will be carried on around by the saws 16 and swept between said saws and the screen 20. As the cotton is swept between the saws and the screens 21, 20 sand, dirt and the like will be removed, in a large measure, from the seed cotton. The cotton will pass on up between the huller saws and the gin saws, and the latter rotating more rapidly than the former will pick up the seed cotton and carry it up into the roll box 2 where it will be formed into a roll to be operated on by the gin saws in the usual manner.

There is a transverse deflector board 23 extending across the gin casing in front of the gang of huller saws which directs the seed cotton delivered into the hopper 8 toward said huller saws. This deflector board is adjustable as shown.

The drawing and description disclose what we now consider to be a preferred form of the invention by way of illustration only, while the broad principle of the invention will be defined by the appended claims.

What we claim is:

1. In a cotton gin having a roll box to receive seed cotton and a gang of gin saws arranged to operate on the roll to strip the lint from the seed thereof, a huller hopper, a gang of huller saws, a rotatable cleaner brush beneath and arranged to cooperate with, said huller saws, a deflector board above and in front of the huller saws, said huller saws being arranged to carry the seed cotton from said hopper into cooperation with the cleaner brush and to deliver the same to the gin saws whereby the seed cotton is transferred into the roll box and guide means for the seed cotton carried around by the huller saws whereby said cotton may be held in working relation with the huller saws during the course of its delivery to the gin saws.

2. In a gin having gin saws, a huller comprising a hopper, a gang of huller saws in the hopper arranged to cooperate with the gin saws, screens spaced apart and spaced from and partly surrounding the huller saws and a cylindrical cleaner brush between the screens arranged to cooperate with the huller saws.

3. In a gin having gin saws, a huller having a receptacle for seed cotton, huller saws in the receptacle arranged in staggared relation with the gin saws, a rotatable, cylindrical cleaner brush beneath, and arranged to cooperate with, said huller saws, a deflector board in front of and declining toward the huller saws, said huller saws being rotatable to carry the seed cotton around into the range of the cleaner brush, whereby hulls and foreign objects are removed therefrom, and to deliver said cotton to the gin saws and guide means across the hopper beneath and spaced from the huller saws for guiding the seed cotton around by the huller saws as said saws rotate, whereby said cotton is held in working relation with the huller saws during the course of its delivery to the gin saws for delivery by the last-mentioned saws into the roll box.

4. In a gin having gin saws, a huller having a receptacle for seed cotton, huller saws in the receptacle arranged in staggered relation with the gin saws, a rotatable cleaner brush arranged to cooperate with huller saws, said huller saws being rotatable to carry the seed cotton around into the range of the cleaner brush whereby hulls and foreign objects are removed therefrom, and to deliver said cotton to the gin saws, and screens on opposite sides of the brush about which the seed cotton is swept by said huller saws.

5. In a cotton gin a hopper for the reception of seed cotton, a gang of huller saws disposed transversely across the hopper and spaced apart, means for rotating said saws, screens disposed transversely across the hopper spaced from and partly surrounding said saws underneath, said screens being spaced apart, a rotatable cleaner brush beneath, and arranged to cooperate with the saws, and located between said screens whereby foreign matter may be removed from the seed cotton carried around by the saws into cooperating relation with the cleaner brush, said hopper having a discharge chute for the discharge of said foreign matter from said hopper.

6. In a gin having a roll box and gin saws arranged to act on seed cotton in said roll box, a huller hopper adjacent said roll box, huller ribs between said hopper and roll box and arranged between said saws, a gang of huller saws disposed transversely across said hopper and arranged to cooperate with the gin saws, a rotatable cleaner brush beneath and in cooperating relation with said huller saws, transverse partitions across said hopper arranged beneath and spaced from the huller saws and forming guides for the seed cotton carried around by the huller saws as said saws rotate, whereby said seed cotton may be held in working relation with the huller saws during the course of its delivery to the gin saws for delivery by the last mentioned saws into the roll box.

THOMAS R. ALLEY.
JOSEPH D. ALLEY.